United States Patent
Hiramine

[11] Patent Number: 5,943,784
[45] Date of Patent: Aug. 31, 1999

[54] MEASURING NAIL

[76] Inventor: Shigeru Hiramine, 3251 Banchi, Satomurasato, Satsuma-gun, Kagoshima-Prefecture, Japan

[21] Appl. No.: 08/891,865
[22] Filed: Jul. 9, 1997

[30]     Foreign Application Priority Data

Jan. 17, 1997 [JP] Japan ................................. 9-019866

[51] Int. Cl.⁶ ................................................. G01C 15/02
[52] U.S. Cl. ..................... 33/293; 33/493; 116/DIG. 16
[58] Field of Search ............................. 33/293, 483, 485, 33/492, 493, 494, 521; 116/209, DIG. 16; 40/612; 404/93

[56]             References Cited

U.S. PATENT DOCUMENTS

| | | | |
|---|---|---|---|
| 3,973,327 | 8/1976 | Cardinale | 33/293 |
| 4,141,310 | 2/1979 | Rich, Jr. | 33/293 |
| 4,926,785 | 5/1990 | Lamson | 116/209 |
| 4,972,591 | 11/1990 | Hammet | 33/293 |
| 5,052,329 | 10/1991 | Bennett | 116/209 |
| 5,174,237 | 12/1992 | Beard | 116/209 |
| 5,205,236 | 4/1993 | Hughes | 116/209 |
| 5,207,175 | 5/1993 | Andonian | 116/209 |
| 5,501,170 | 3/1996 | Walsh | 116/209 |

*Primary Examiner*—G. Bradley Bennett
*Attorney, Agent, or Firm*—Price, Gess & Ubell

[57]            ABSTRACT

This invention provides a measuring nail which can be prevented from being pulled out from a roadbed even when pushed down on the roadbed by a motorized grader, a macadam roller, a tired roller, a tire of a dump car carrying a pavement material or a foot of a worker, to provide an improved working efficiency.

The measuring nail of this invention comprises a nail body embedded in a roadbed and a rod-like elastic member engageable with a top end of said nail body.

6 Claims, 15 Drawing Sheets

MEASURING NAIL

BACKGROUND OF THE INVENTION

1. Field of the Invention

The present invention relates to a measuring nail for use in measuring a thickness at which roadbed materials of concrete or asphalt pavement are evenly laid on a roadbed for paving a road therewith, or a thickness at which ballast, crushed stone and cobble stone are evenly laid on the roadbed for forming a basic concrete or for installing secondary concrete products.

2. Description of the Prior Art

For paving a road by laying pavement materials evenly over a roadbed, for example, the roadbed is first corrected in the unevenness and then is rolled and compacted with a machine such as a macadam roller, a tired roller, a hand roller or a vibration roller. Thereafter, wooden measuring piles or iron measuring piles are embedded in the rolled and compacted roadbed in such a manner that their upper portions can project from the roadbed by a certain height and also their top surface can be flush with an expected height of the roadbed.

Taking the work of laying asphalt evenly over the roadbed for instance, vehicles such as a motorized grader and an asphalt finisher are run over the asphalt to spread the asphalt uniformly. When a worker spreads the pavement material by using those vehicles, the length of projecting portions of the embedded piles serves as a guide for his paving the road with the pavement material at a uniform thickness. It is noted that the spreading of the pavement material may be carried out with hands, instead of the vehicles.

However, this conventional type measuring pile mentioned above can often be pushed down on and pulled up from the roadbed by a blade of the motorized grader, a foot of the worker or a tire of a pavement material carrying dump car. The pile pulled out from the roadbed have to be readjusted in its vertical level at much expense in time and effort or energy, while it is embedded again in the roadbed.

SUMMARY OF THE INVENTION

The present invention has been made to avoid the above mentioned disadvantages. The object of the invention is to provide a measuring nail which can be prevented from being pulled out from a roadbed even when pushed down on the roadbed by a motorized grader, a macadam roller, a tired roller, a tire of a dump car carrying a pavement material or a foot of a worker, to provide an improved working efficiency.

In other words, this invention provides a measuring nail comprising a nail body embedded in a roadbed and a rod-like elastic member engageable with a top end of said nail body. According to a measuring nail of the invention, since an upper portion of the measuring nail is formed by an elastic member, even when a force is exerted on the upper portion of the measuring nail to deform it, the upper portion of the measuring nail can be resiliently returned to the original position. Therefore, even when the motorized grader, the macadam roller, the tired roller, the tired roller of the dump car, or the worker treads on the measuring nail in the casting, smoothing and rolling of a road forming material including broken stone, the measuring nail can be avoided being pulled out from the roadbed.

Also, the elastic member is desirably made of synthetic resin to be cut at a desired vertical level. This can facilitate making changes in the thickness of the road forming material layer according to circumstances in-situ. Further, the synthetic resin is preferably molded into a generally cylindrical form. This constructed measuring nail can provide the result that even when the measuring nail is trod by the motorized grader, the tired roller of the dump car, or the worker and thereby is bent at right angles, the stress on the bent part of the measuring nail can be absorbed with a cavity at the bent part deformed. This enables the compression stress and tensile stress on the elastic member to be reduced to improve durability of the elastic member.

In addition, where an engaging portion of said elastic member and an engaging portion of said nail body are screwably connected to each other, the elastic member is enabled to be firmly engaged with the nail body, to prevent the elastic member from disengaged from the nail body in the middle of the pavement work. Further, where an engaging portion of said elastic member and an engaging portion of said nail body are in the form of a projection and a recess which are vertically insertable relative to each other, the construction of the engaging portions of the elastic member and nail body and the jointing work can be simplified. In addition to the advantage of the simplification mentioned above, where an engaging portion of said elastic member and an engaging portion of said nail body are in the form of a flange and a horizontal groove fittingly engageable with said flange, said flange and said horizontal groove allowing said engaging portions to be connected to each other by horizontal sliding operation, a resistance to a vertical tensile stress can be increased.

Further, where said nail body is provided at its periphery with a plurality of projections and depressions, since a contact resistance between the nail body and the roadbed can be increased, even when a large stress at disengagement is imposed on the measuring nail, the measuring nail is prevented from being drawn out of the roadbed. Furthermore, where the measuring nail is formed of rigid synthetic resin, manufacturing costs of the nail body can be reduced and also a plurality of projections and depressions can be formed on the periphery of the nail body very easily.

Moreover, where said elastic member is provided at its top end with an engaging portion corresponding in shape to an engaging portion formed on a bottom end of a joint use elastic member and wherein said joint use elastic member is provided at its top end with an engaging portion similar to said engaging portion of said elastic member, since a joint use elastic member can be optionally jointed to the top end portion of the elastic member, as needed, a thickness at which the road forming material including broken stone is cast can be selectively set.

Besides, where said elastic member is provided at its periphery with scales or ring grooves at certain intervals along a longitudinal direction thereof, or where said elastic member is provided at its periphery with ring grooves at certain intervals along a longitudinal direction thereof and a ring at least having a different color from said elastic member is engaged in any one of said ring grooves, the thickness of the road forming material can be controlled by use of the scales, the ring grooves or the ring, to facilitate the work.

DETAILED DESCRIPTION OF THE PREFERRED EMBODIMENT

Figure 1:
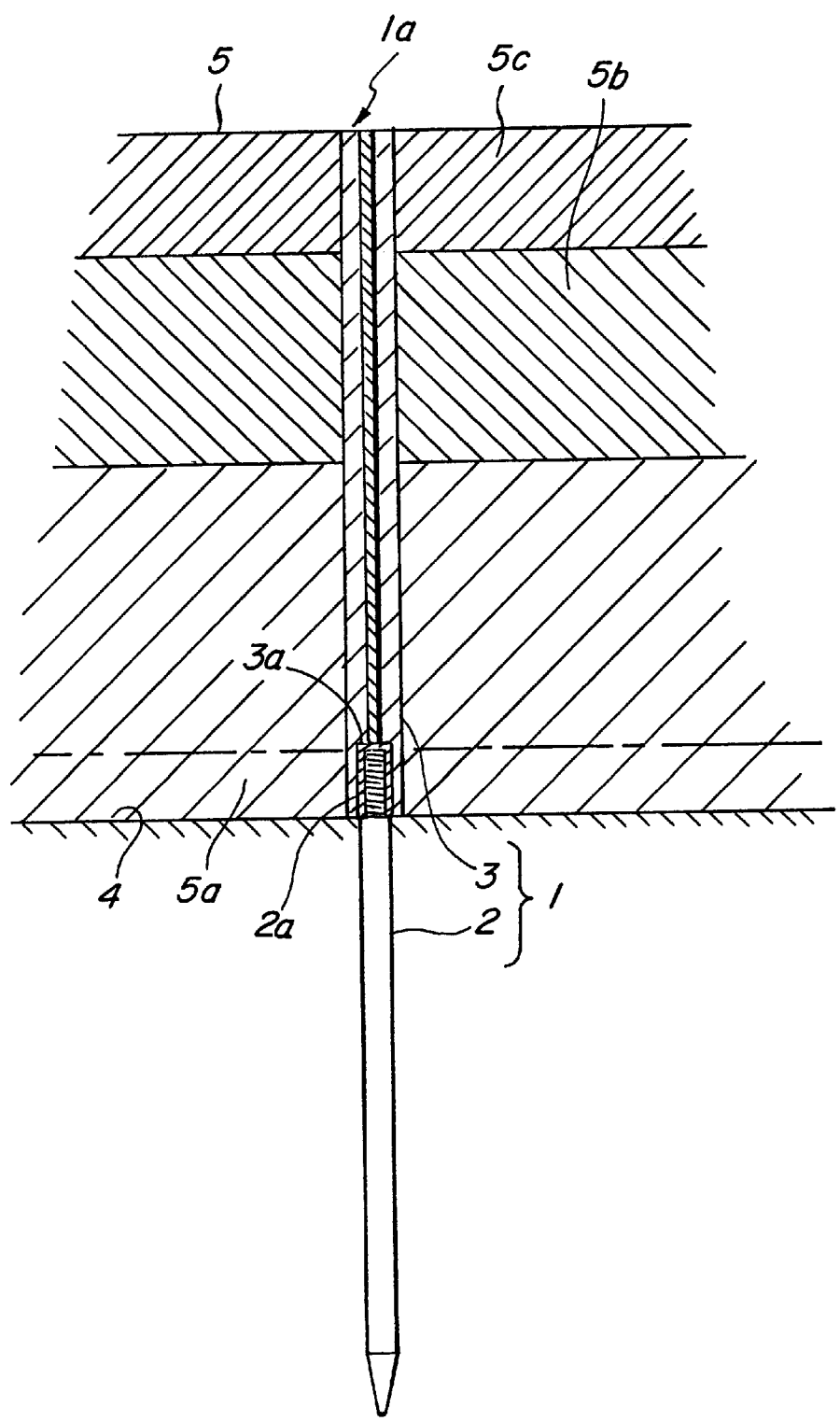
FIG. 1 is a vertical sectional view of a preferred embodiment of the measuring nail of the invention.

Referring now to the accompanying drawing figures, examples of the preferred embodiments of the measuring nail of the invention for used in paving a road with asphalt or laying broken stone evenly on a roadbed is described below. It is to be understood, however, that the scope of the invention is by no means limited to the illustrated embodiments.

In FIGS. 1 through 6, shown by 1 is a measuring nail, 2 is a nail body of the measuring nail 1 formed of iron, and 3 is an elastic member screwably engaged with a top end portion of the nail body 2. The measuring nail 1 is embedded in a roadbed 4 which was corrected in unevenness. On the roadbed 4, a lower roadbed layer 5a, an upper roadbed layer 5b and an asphalt layer 5c are layered in this order with a proper thickness so that a road surface 5 can be flush with a top end 1a of the measuring nail. In this embodiment, the lower roadbed layer 5a, the upper roadbed layer 5b and the asphalt layer 5c are formed by unscreened broken stone, graded grain broken stone and asphalt, respectively. If the broken stone is simply required to be evenly laid on the roadbed, the asphalt need not be used.

Figure 2:
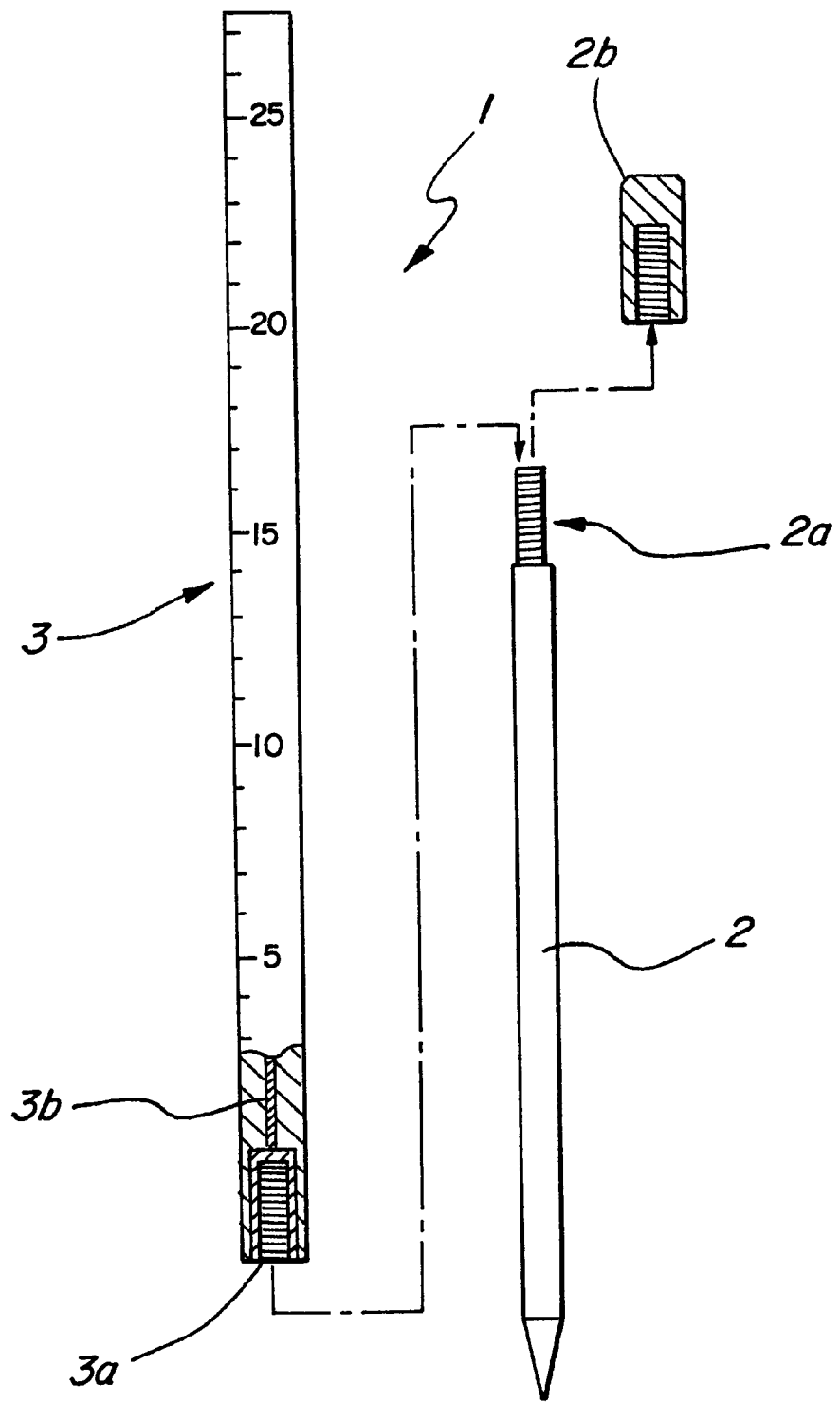
FIG. 2 is an exploded view partially in section illustrating the construction of the measuring nail.

FIG. 2 illustrates the construction of the measuring nail 1 with a side elevation view and a partial cross-sectional veiw. As best shown in this figure, the nail body 2 is in the form of an iron rod having a diameter of 7.5 mm for example and has a tapered portion in conical shape at its lower end portion and a male screw 2a at its top end portion. A cap 2b, which is a metal cap nut, is screwed with the male screw 2a so that the nail body 2 can be hit at its top end with a hammer (see FIG. 4 also).

On the other hand, the elastic member 3 is in the form of a bar principally made of synthetic rubber (synthetic resin) and having a diameter of about 16 mm and has at its lower end a cap nut 3a to be screwably engageable with the male screw 2a. Also, the elastic member 3 is provided at its center portion with a relatively rigid and extensible silk gut core 3b, to not only prevent a synthetic rubber part of the elastic member 3 from being broken with a local stress but also avoid being torn off even when broken.

Further, the elastic member 3 is colored red for example so that it can be easily distinguished from pavement materials such as asphalt, broken stone and the like (hereinafter simply referred to as pavement materials). Also, the elastic member 3 has at its periphery a scale 3c graduated from a designed level at the bottom at 5 mm intervals along the longitudinal direction thereof, as described later. By screwing the elastic member 3 with the male screw 2a in place of the cap 2b, the measuring nail 1 useful for the working of evening the pavement material is assembled.

Figure 3:
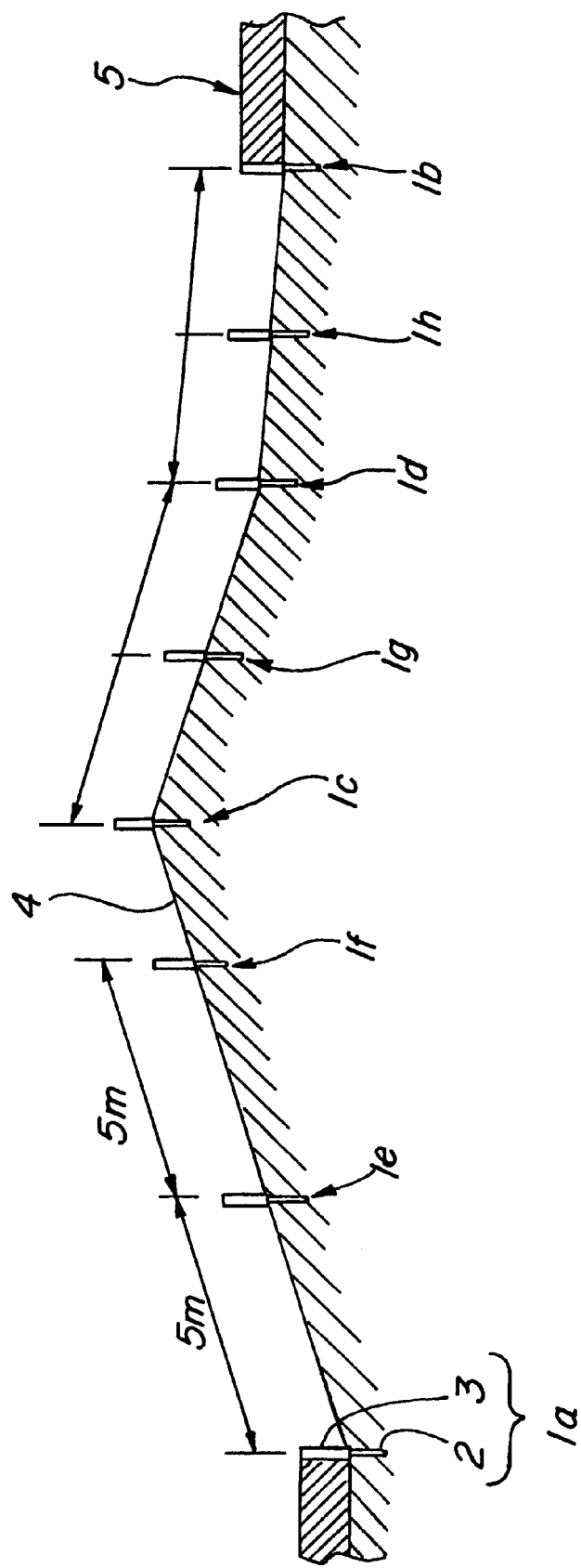
FIG. 3 is a side view in vertical section illustrating the state of the measuring nails being embedded.

FIG. 3 is a side view in vertical section illustrating places at which the measuring nails 1 are to be planted in the work of laying the pavement material evenly. Shown by 1a–1h are all the measuring nails 1 having the same shape, though they are applied different reference numerals, for purpose of convenience. Also, the measuring nails 1 are practically arranged in a direction of depth as well, as viewed in the figure, though an example of the measuring nail 1 being linearly arranged is shown in FIG. 3, for purpose of simplification of explanation.

In FIG. 3, the measuring nails 1a, 1b are arranged at the ends of a roadbed as corrected in unevenness and rolled and compacted for the work of laying the pavement materials evenly. The measuring nails 1c, 1d are driven in the roadbed at points at which inclination of the roadbed varies. The measuring nails 1e, 1f are driven in the roadbed at intervals of 5 m from the measuring nails 1a, 1f, respectively. And, the measuring nails 1g, 1h are driven in the roadbed at the center between the measuring nails 1c and 1d and at the center between the measuring nails 1d and 1b, respectively.

In this embodiment, by knocking the measuring nails 1 in a pavement area of the roadbed at the corners, at the points at which inclination of the roadbed varies and at the points at which intervals between neighboring measuring nails are within 5 m or at the centers between two neighboring measuring nails, the each measuring nail 1 serves as a fiducial point for spreading the pavement material with a uniform thickness substantially all over the pavement surface. The intervals are not limited to the ones illustrated in the embodiment. The measuring nails 1 may practically be arranged in any suitable manner, e.g., in such an arrangement that the measuring nails 1 on a plane depict equilateral triangles with intervals of 6–7 m or less between neighboring measuring nails.

Figure 4:
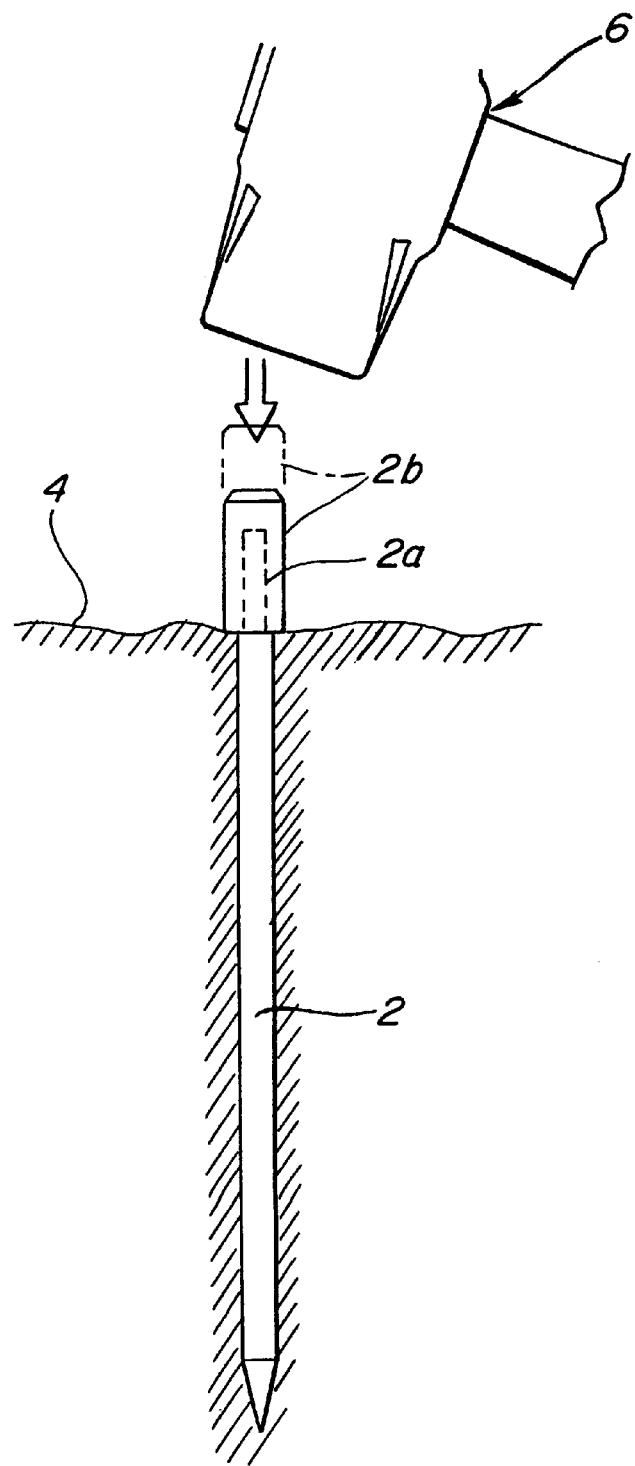
FIG. 4 is a side elevation view illustrating the method of using the measuring nail.
Figure 5:
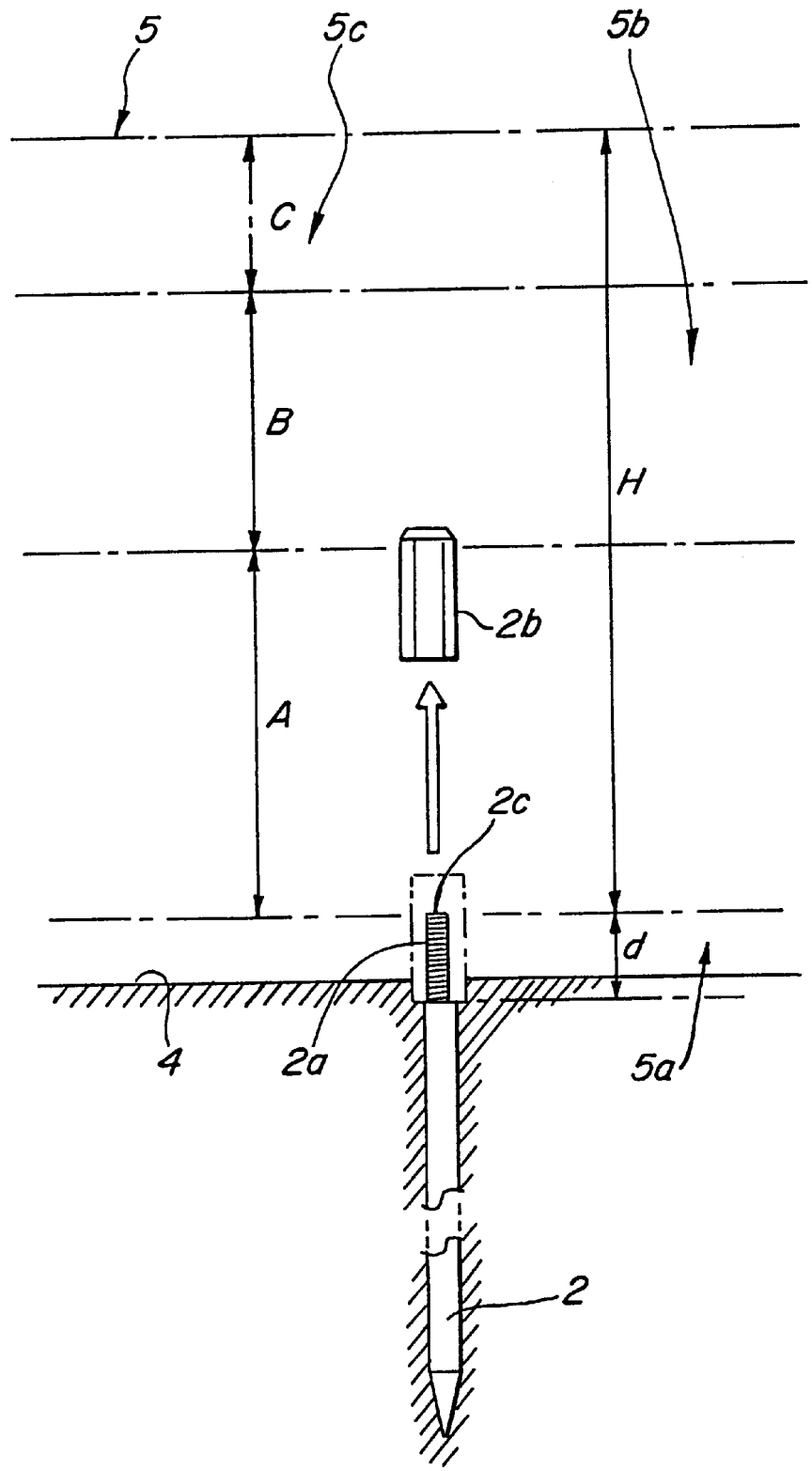
FIG. 5 is a side elevation view illustrating the method of using the measuring nail following FIG. 4.
Figure 6:
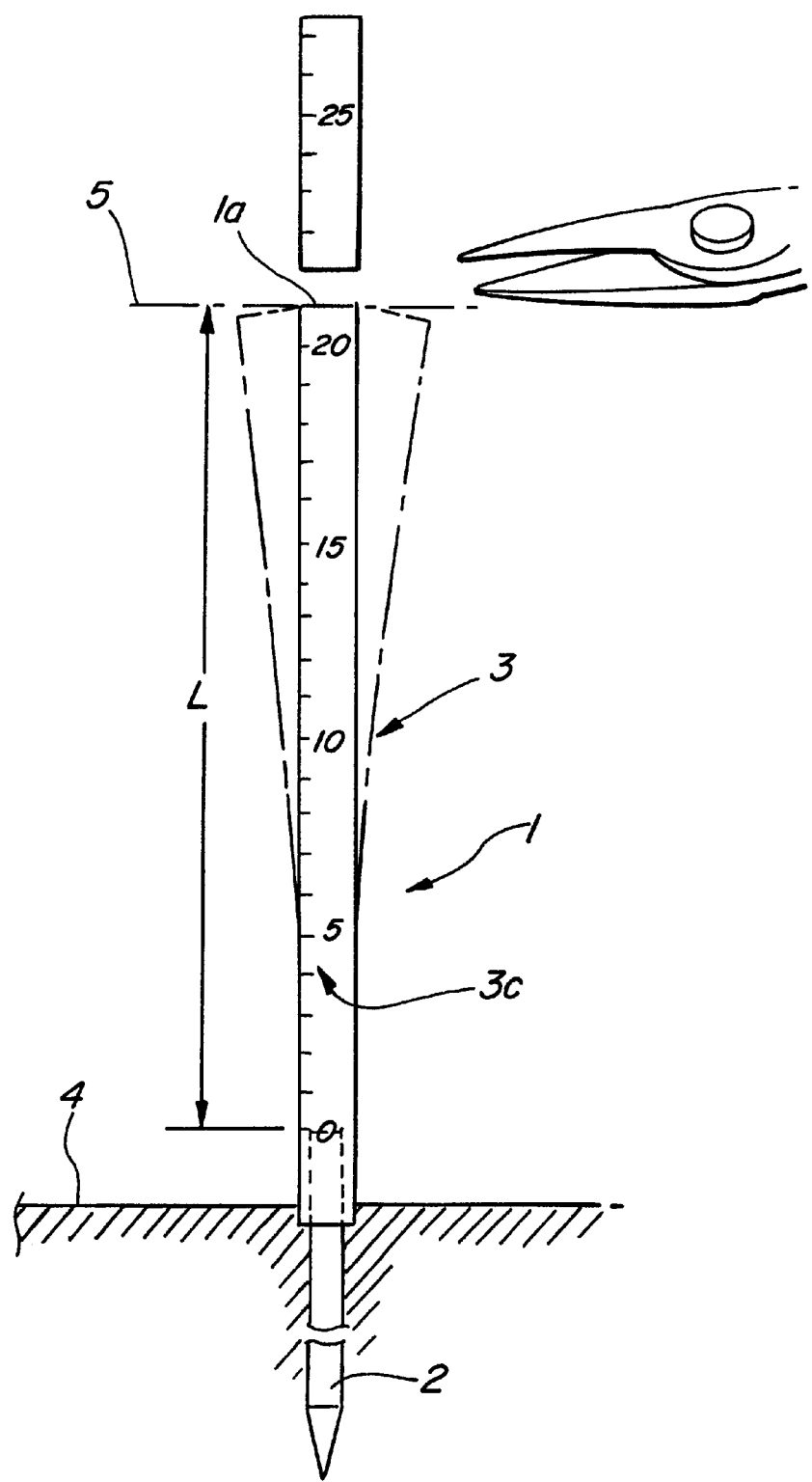
FIG. 6 is a side elevation view illustrating the method of using the measuring nail following FIG. 5.

FIGS. 4–6 illustrates an order in which the pavement work is practiced by using the measuring nails 1. First, the nail body 2 is knocked in the roadbed 4 after the unevenness of the roadbed was corrected. At this time, the top end portion of the nail body 2 is protected by the cap 2b threadedly engaged with the nail body 2, as shown in FIG. 4. Thus, a worker can hit the cap 2b at its top with a hammer 6 or the like with a sufficient force to drive the nail body 2 into the hardened roadbed 4, with ease and with no fear of damaging the male screw 2a at the top of the nail body 2.

After that, the cap 2b is removed from the nail body 2, as shown in FIG. 5, and the vertical level of the top end 2c of the nail body 2 is measured. Then, the vertical level of the top end 2c is finely adjusted so as to be lowered from an expected road surface 5 Just by an amount of H. For example, in a case where the lower roadbed 5a, the upper roadbed 5b and the asphalt layer 5c have thickness of 10 cm, 7 cm and 4 cm, respectively, the vertical level of the top end 2c is so adjusted as to be lowered from the expected road surface 5 by an amount of 21 cm (H=A+B+C=10+7+4). It is noted that the vertical level of the top end 2c of the nail body 2 is a designed vertical level of the roadbed, and d represents a length of the male screw 2a. Also, the fine adjustment of the vertical level of the nail may be omitted in the work of laying a general pavement material evenly over the roadbed. In such a case, the vertical level of the top end 2c of the pounded nail body 2 can be regarded as a designed vertical level of the roadbed.

After completion of the above-described measurement and adjustment of the vertical level of the nail body, the elastic member 3 is threadedly engaged with the male screw 2a, to complete the measuring nail 1, as shown in FIG. 6. The elastic member 3, principally made of synthetic rubber, can be easily cut even in the state of being connected to the nail body 2. Also, since the elastic member 3 has on its periphery a scale 3c to indicate the height from the point of the designed vertical level, it can be cut very easily at such a position that the top end 1a of the measuring nail 1 can be in align with the expected position of the road surface 5. In the above-described embodiment in which asphalt is used as a pavement material, since the lower roadbed 5a, the upper roadbed 5b and the asphalt layer 5c have thickness of 10 cm, 7 cm and 4 cm, respectively, the elastic member 3 is cut at 21 cm in the scale.

Thereafter, the unscreened broken stone and the like is laid evenly to a vertical level of 10 cm in the scale 3c on the elastic member 3 and then is rolled and compacted to thereby produce the lower roadbed 5a. Then, the graded grain broken stone and the like is laid evenly to a vertical level of 17 cm in the scale 3c on the elastic member 3 and then is rolled and compacted to thereby produce the upper roadbed 5b. Further, the asphalt or concrete is evenly laid and then is rolled and compacted, to be flush with the top end 1a of the measuring nail 1, whereby the pavement is completed.

According to the measuring nail 1 of the invention, since the embedded portion thereof is formed of a material of high rigidity, the measuring nail 1 can be easily embedded into the roadbed corrected in its unevenness. In addition to this, since the projecting part of the measuring nail 1 is formed by the elastic member 3, even when pushed down by a tire of a motorized grader, a macadam roller, a tired roller and a dump car carrying the pavement material, or a foot of a worker, the measuring nail 1 is avoided from being pulled out from the roadbed 4. Therefore, once the precise vertical level of the measuring nail 1 is determined at the step shown in FIG. 5, no troublesome measurements are required again in the sequential work, thus providing an improved working efficiency.

Needless to say, the measuring nail 1 of the invention is not limited to the concrete size specified in this embodiment. Similarly, the elastic member 3 of the invention may be formed of another synthetic resin, instead of the synthetic rubber used in the this embodiment, and an elastic member formed of resilient metal such as a spring may be used as a core, instead of the silk gut. Also, the elastic member 3 may be so formed in advance as to have a required length in standard works. Further, the scales 3c at the points indicating the designed vertical levels of the roadbeds 5a, 5b and the road surface 5 may be highlighted by affixing a vinyl tape thereto with adhesive or applying colors thereto. When these modifications are made, the need of cutting the elastic member 3 in situ can be eliminated. Also, the scales 3c may even be omitted.

Additionally, it is to be noted that the measuring nail 1 of the invention is not limited to the application to the pavement with asphalt, as in the above-described embodiment just taken as an example. The measuring nail of the invention is applicable not only to pavements with concrete but also to air ports and harbors. Further, the measuring nail is of course applicable when some base of a building site is formed by using broken stone, cobble stone and the like.

Figure 7:
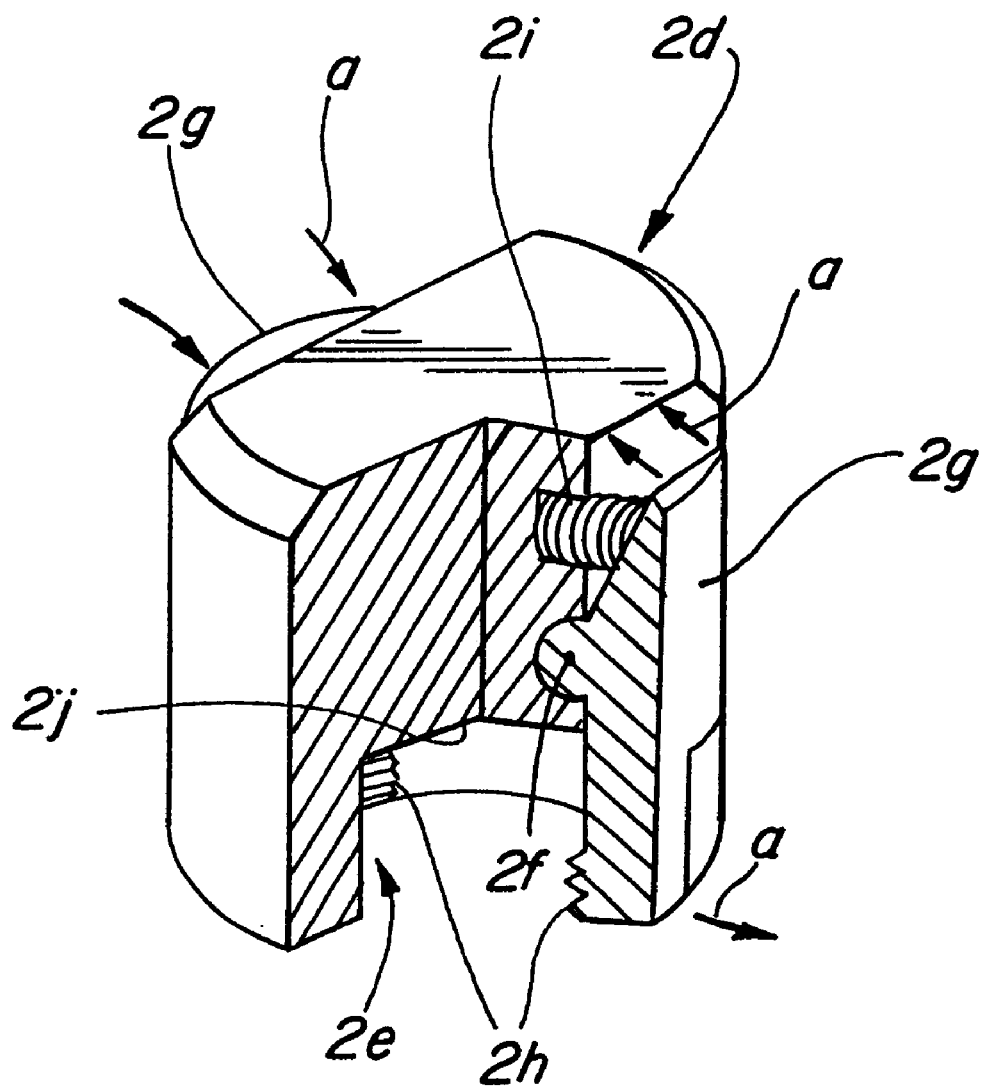
FIG. 7 is a perspective view in partly section of another embodiment of a cap for the measuring nail.

FIG. 7 illustrates a modified cap 2d to be attached to the top end of the nail body 2 of the measuring nail 1. The cap 2d illustrated in the same figure forms therein a recessed portion 2e having a diameter which allows the male screw 2b to be inserted therein from a center part of a bottom end of a generally columnar member made of metal, and also is provided at its both sides with tilting members 2g tiltable around their axes 2f. Each tilting member 2g has an inner periphery at the lower part thereof on which a transversal thread 2h corresponding to the male screw 2b is formed.

This cap 2d can be freely detached from the top end of the nail body 2 by holding the top ends of the two tilting members 2g with fingers to be tilted in the directions of arrows a. In the state of the top ends of the tilting members being released from the fingers, the transversal threads 2h are in engagement with the male screws 2a by a spring 2i (see FIG. 5). Thus, the cap 2d can be attached to and detached from the top end of the nail body 2 at a one-touch simple operation. This designed cap 2d enables the work in situ to be further simplified. If there is a gap between the top end of the nail body 2 and an impact transmitting surface 2j of the cap 2d in the state of the cap 2d being fit onto the nail body 2, the cap 2d is lightly tightened to bring the impact transmitting surface 2j into direct contact with the top end of the nail body 2.

Figure 8:
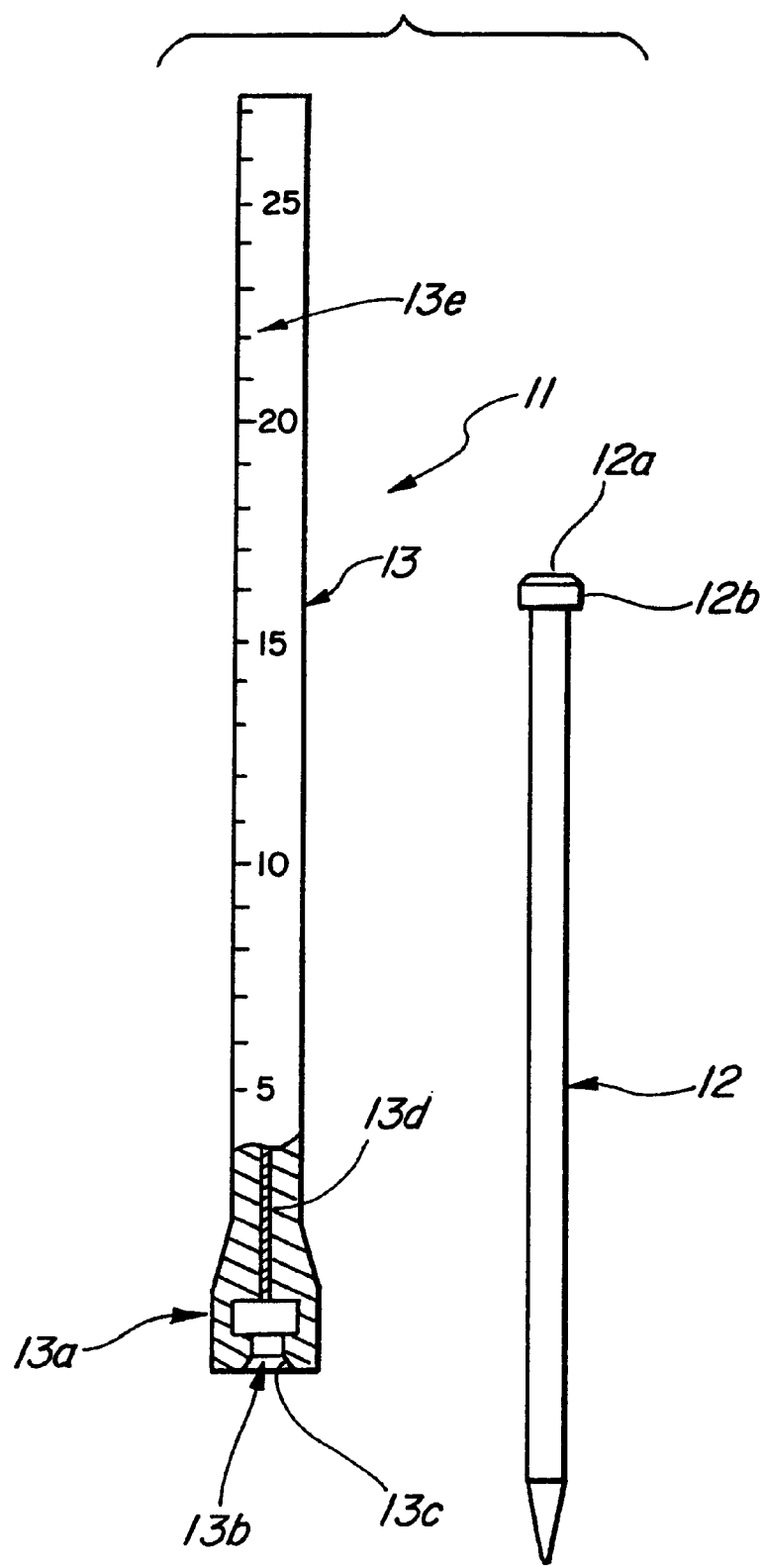
FIG. 8 is a side elevation view in partly section of the construction of the another embodiment of the measuring nail of the invention.

FIG. 8 shows another modification of the measuring nail 1 of the invention. Shown by 11 in the figure is a measuring nail which comprises a nail body 12 and an elastic member 13.

The nail body 12 is in the form of a rod made of metal for example. The nail body 12 has a pointed bottom end and has at its top end a hammer striking surface 12a and a flange 12b. The elastic member 13 is in the form of a rod made of synthetic rubber. The elastic member 13 has a bottom portion at which a large diameter portion 13a is formed. The large diameter portion 13a is provided at its bottom with an insertion bore 13b to insert the nail body 12 therein and a small diameter portion 13c, formed on an inner periphery of the insertion bore 13b, to engage with the flange 12b. The large diameter portion 13a and the small diameter portion 13c are formed concentrically. In addition, an acrylic string is inserted in a center portion of the elastic member 13 as a core 13d. The elastic member 13 has a scale 13e formed on a periphery thereof so that the elastic member 13 can be cut at a precise vertical level keeping a distant from a datum level.

This constructed measuring nail 11 requires reduced components and accordingly can be made at reduced manufacturing costs. Also, the nail body 12 and the elastic member 13 are engaged with each other readily and speedily by simply pressing the elastic member 13 onto the top end of the nail body 12, thus providing an improved workability. Further, since the top end of the nail body 12 is formed as the hammer striking surface 12a, the top end of the nail body 12 need not be covered with any separate cap or the like when struck with a hammer.

Illustrated in FIGS. 9 through 13 are further modifications of the measuring nail 11. The features of these modifications reside in the construction of the engaging portion of the nail body with the elastic member and in the construction of the elastic member itself. While the following examples show their features and the resulting effects, the present invention does not impose any limitation on the shape or form. In other words, any selection may be freely made on combination of the elements.

Figure 9:
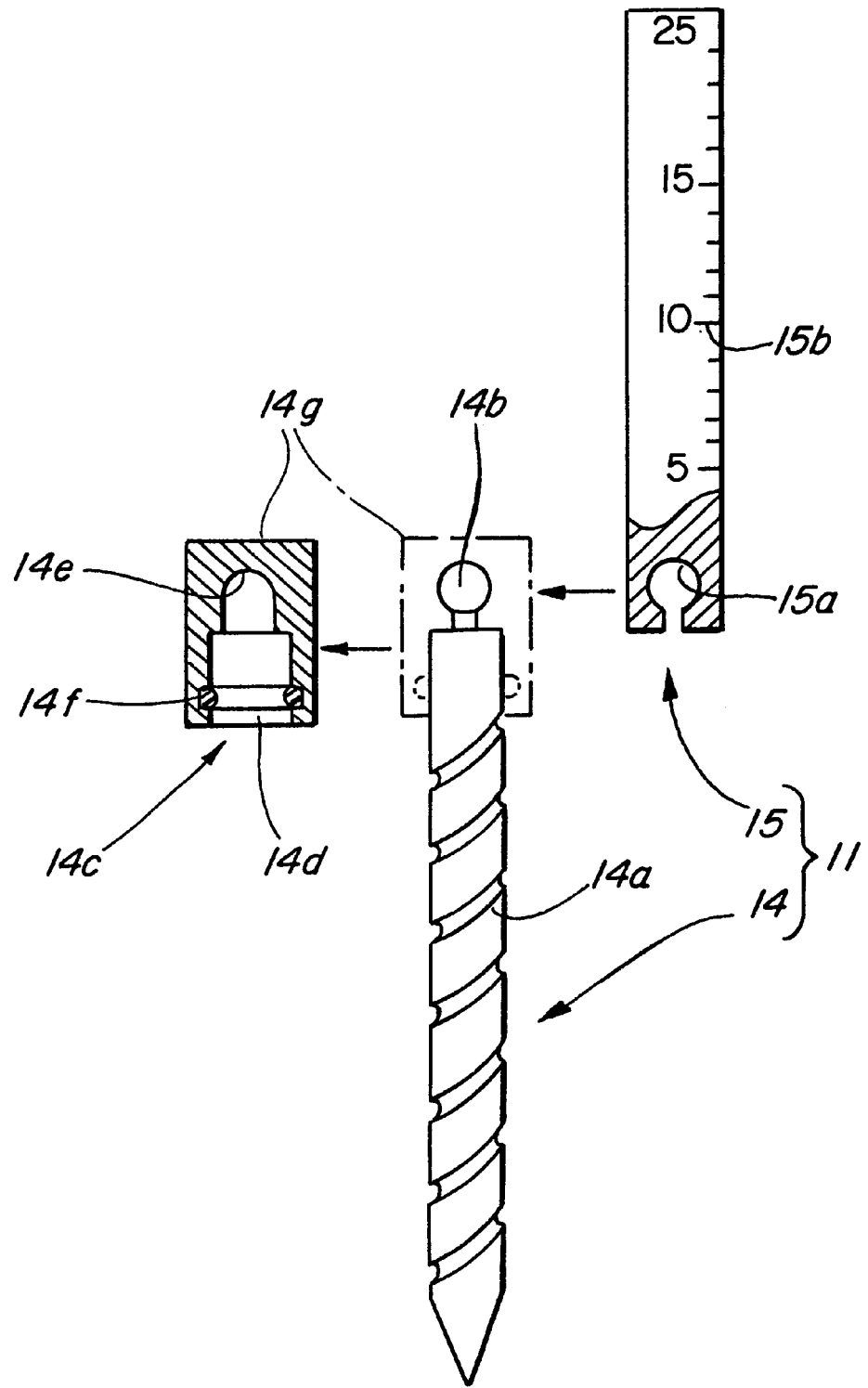
FIG. 9 is a side elevation view in partly section of the variant of the measuring nail.

In FIG. 9, shown by 14 is a nail body in the form of a rod made of rigid synthetic resin for example. The nail body 14 has a pointed bottom end and has a periphery on which a helically cut groove 14a is formed to define a plurality of projections and depressions on the periphery of the nail body 14. On the top end of the nail body 14, a generally sphere-like engaging portion 14b (a projection) is formed.

In this embodiment, the groove 14a formed on the periphery of the nail body 14 enables frictional resistance between the nail body 14 and the roadbed 4 to be increased. Therefore, even when the nail body 14 is pushed down by a blade of the motorized grader, a foot of the worker or a tire of the pavement material carrying dump car, since the nail body 14 is firmly engaged in the road bed 4 at the groove 14a, the nail body 11 can be avoided being pulled out of the road bed 4 with ease.

14c designates a cap for covering the engaging portion 14b. The cap 14 has a bottom end in which a hole 14d having an inner diameter equal to an outer diameter of the nail body 14a is formed. In the back of the hole 14d, a cut portion 14e corresponding in shape to the engaging portion 14b is formed to be contacted with the same. 14f denotes an O-ring made of synthetic rubber as fit in the hole 14d. The O-ring 14f can contact with the outer periphery of the nail body 14 in the state of being fit into the cap 14c, to lightly retain the cap 14c.

By striking a top end 14g of the cap 14c fit in the nail body 14 with a hammer or equivalent, the nail body 14 can be applied a sufficient force to be knocked in the roadbed 4 without damaging the engaging portion 14b. The cap 14c can be fit into the nail body 14 by simply fitting the cap 14c onto the nail body 14 from above, thus minimizing the energy for the fitting work. If the roadbed 4 is soft, the cap 14c need not be used.

On the other hand, an elastic member 15 is in the form of a rod made of synthetic rubber and is provided at its bottom with an engaging portion 15a (a recess) having a generally spherical inner surface concentrically. The elastic member 15 is engaged with the nail body 14 by fitting the engaging portion 15a into the engaging portion 14b after the cap 14c having been removed from the knocked nail body 14. The elastic member 15 is provided at its periphery with a scale 15b to show a vertical level from the datum surface precisely. Since the engagement of the nail body 14 with the elastic member 15 simply requires the vertical inserting operation, the work can be simplified to provide an improved working efficiency. Further, the measuring nail 11 constructed above requires reduced components and can be made at reduced costs.

Figure 10:
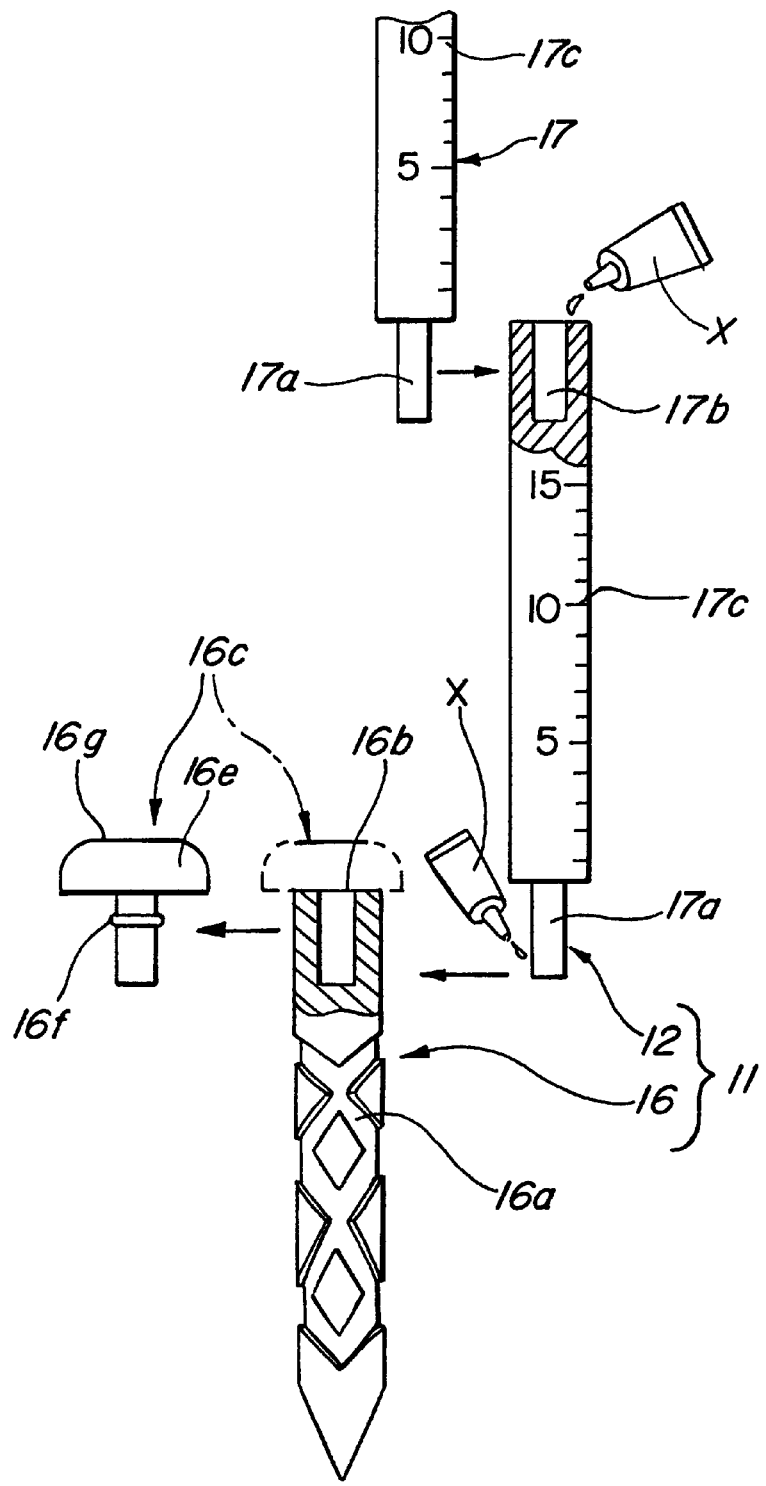
FIG. 10 is a side elevation view in partly section of the another variant of the measuring nail.

In FIG. 10, shown by 16 is a nail body in the form of a rod made of rigid synthetic resin for example. The nail body 16 has a pointed bottom end and has a periphery on which crosswise cut grooves 16a are formed to define a plurality of projections and depressions on the periphery of the nail body 16. Shown by 16b is a hole concentrically formed on the top end of the nail body 16 at the center thereof. The hole 16b forms an engaging portion 16b (a recess). The grooves 16a formed on the periphery of the nail body 16 enable frictional resistance between the nail body 16 and the roadbed 4 to be increased, so that even when the measuring nail 11 is pushed down on the roadbed, the nail body 16 is avoided from being pulled out of the road bed 4 with ease.

16c designates a cap for covering the engaging portion 16b. The cap 16c includes a columnar portion 16d having a diameter slightly smaller than an inner diameter of the engaging portion 16b at the lower end portion of the cap and a flange 16e at an upper portion of the columnar portion 16d. 16f denotes an O-ring made of synthetic rubber fit onto the outer periphery of the columnar portion 16d. The cap 16c can be fit into the nail body 16 by simply pressing the cap 16c into the nail body 16, and in the state of the cap 16c being fit into the nail body 16, the O-ring 16f is in contact with an inner periphery of the hole 16b, to lightly retain the cap 16c to the nail body.

By striking a top end 16g of the cap 16c fit in the nail body 16 with a hammer or equivalent, the nail body 16 can be applied with a sufficient force to be knocked into the roadbed 4 without deforming the hole 16b. If the roadbed 4 is soft, the cap 16c may be omitted.

On the other hand, an elastic member 17 is in the form of a rod made of synthetic rubber and is provided at its bottom end with an integrally formed engaging portion 17a (a projection) projecting concentrically and having a small diameter. The elastic member 17 is engaged with the nail body 16 by fitting the engaging portion 17a into the engaging portion 16b after the cap 16c having been removed from the engaging portion 16b. This enables the engagement work to be simplified, thus providing an improved working efficiency. The elastic member 17 is provided at its periphery with a scale 17c to show a vertical level from the datum surface precisely. The both engaging portions 16b, 17a, when connected, may be bonded to each other with adhesive X, for tight connection.

Further, the elastic member 17 is provided at its top end with a hole having the same shape as the engaging portion 16b. The hole forms an engaging portion 17b engageable with an engaging portion 17a formed at a bottom of an extention or joint use elastic member 17. In this embodiment, the joint use elastic member 17 has the same configuration as the elastic member 17, which allows a plurality of elastic members 17 to be connected, so as to selectively set the overall length of the measuring nail 11.

Figure 11:
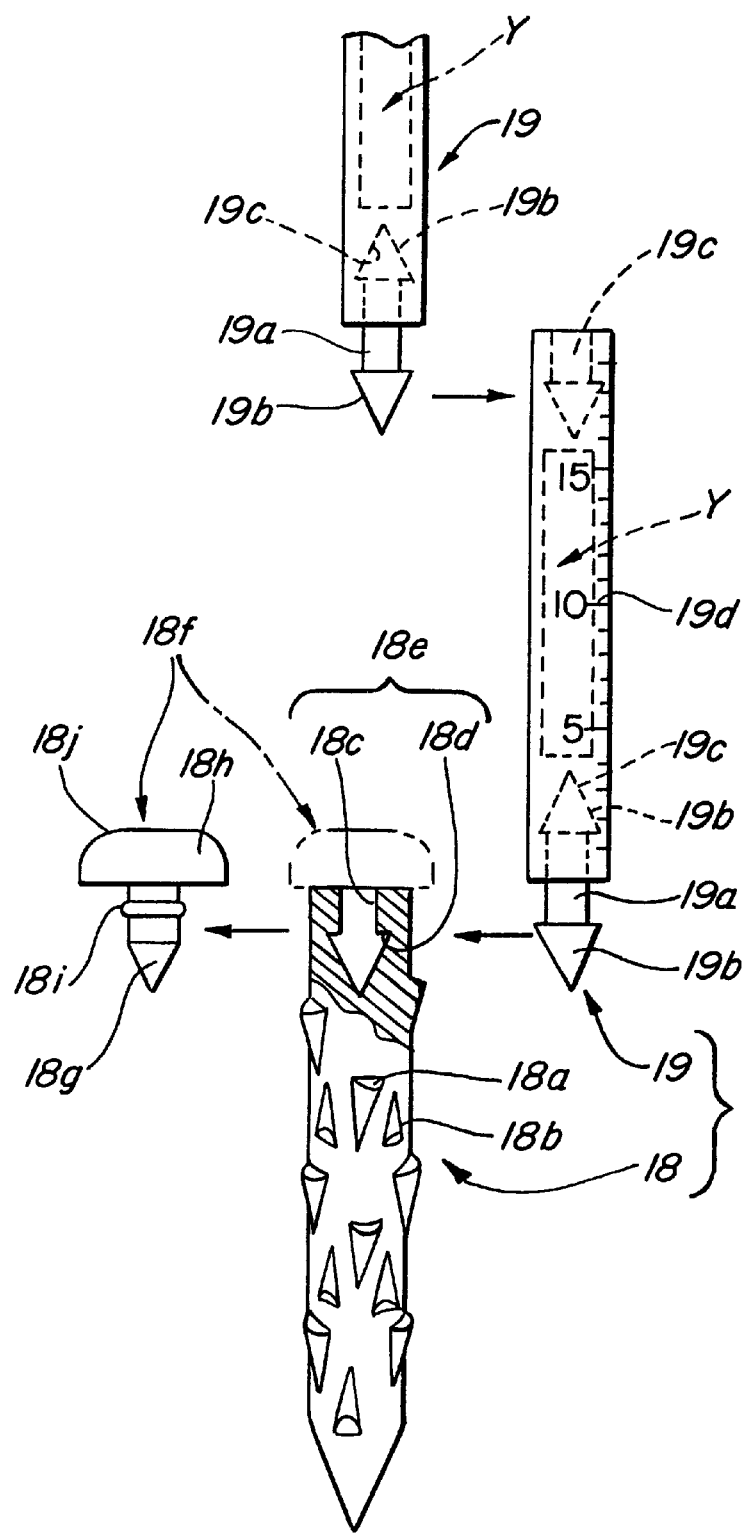
FIG. 11 is a side elevation view in partly section of the further variant of the measuring nail.

In FIG. 11, shown by 18 is a nail body in the form of a rod made of rigid synthetic resin for example. The nail body 18 has a pointed bottom end and has a periphery on which a plurality of projections 18a and recesses 18b (a plurality of projections and depressions) are formed. The projections 18a and the recesses 18b are both so configured that they can offer a reduced resistant to the knocking of the nail body 18, but can offer an increased resistant to the pulling out of it. This enables frictional resistance between the nail body 18 and the roadbed 4 to be increased, so that even when the measuring nail 11 is pushed down on the roadbed, the nail body 18 is avoided from being pulled out of the road bed 4 with ease.

Shown by 18c is a hole concentrically formed on the top end of the nail body 18 at the center thereof. 18d designates a stepped portion formed in the inner part of the hole 18c. The hole 18c and the stepped portion 18d form an engaging portion 18e (a recess) with an elastic member. 18f designates a cap for covering the engaging portion 18e. The cap 18f includes a columnar portion 18g having a diameter slightly smaller than an inner diameter of the engaging portion 18c at the lower end portion of the cap and a flange 18h at an upper portion of the columnar portion 18g. On the outer periphery of the columnar portion 18g, an O-ring 18i is fit.

The cap 18f can be fit into the nail body 18 by simply pressing the cap 18f into the nail body 18. By striking a top end 18j of the cap 18f fit in the nail body 18 with a hammer or equivalent, the nail body 18 can be applied a sufficient force to be knocked in the roadbed 4 without deforming the hole 18c. The cap 18f may be of course omitted, if necessary.

On the other hand, an elastic member 19 is in the form of a cylindrical rod having at its center a cavity Y and is sealed with synthetic rubber at its opposite ends. The elastic member 19 is provided at its bottom end with an engaging portion 19a (a projection) projecting concentrically. The engaging portion 19a is made of, for example, a synthetic resin more rigid than that of the elastic member 19 but more flexible than that of the nail body and is in the form of a columnar member having at its upper and lower ends integrally formed, conical insertion portions 19b insertable into the engaging portion 18e.

The elastic member 19 is provided at its bottom portion with an insertion hole 19c corresponding in shape to the engaging portion 18e so that it can be engaged with the nail body 18 by pressing one of the insertion portions 19b which are formed on both ends of the engaging portions 19a into the insertion hole 19c. As illustrated, the elastic member 19 may be also be provided at its top end with a similar insertion hole 19c to connect a plurality of elastic members 19 via the engaging portions 19a. Further, the engaging portion 19a may be integrally formed with the elastic member 19.

The elastic member 19 is engageable with the nail body 18 knocked into the roadbed 4 by inserting the engaging portion 19a into the engaging portion 18e after the cap 18f has been removed from the nail body 18. This enables the engagement work to be simplified and accelerated. The elastic member 19 is provided at its periphery with a scale 19d to show a vertical level from the datum surface precisely.

Since the elastic member 19 is cylindrical in form, even when the elastic member 19 is trod by the blade of the motorized grader or the tire of the dump car, or the worker and thereby is bent at substantially right angles, the stress on the bent part can be absorbed with deformation of the cavity Y in the elastic member at the bent part. This enables the compression stress and tensile stress on the elastic member 19 to be reduced, in comparison with the columnar elastic member, to improve durability of the elastic member 19.

Further, the cylindrically configured elastic member 19 enables the bent portion of the elastic member 19 to be completely returned to the original position while allowing the elastic member 19 to be bent easily, without incompatibles, by increasing the resiliency and hard synthetic resin.

Figure 12:
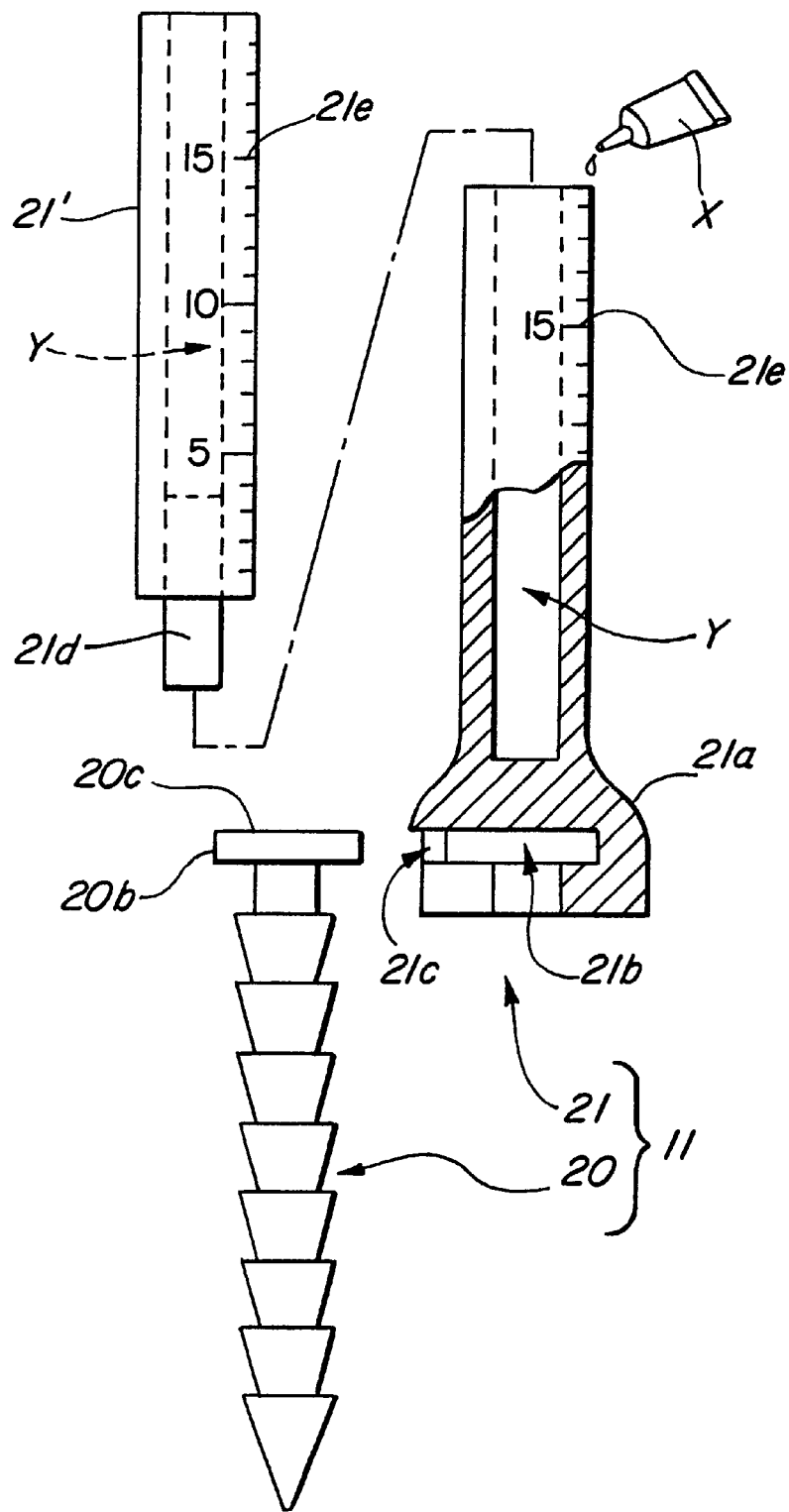
FIG. 12 is a side elevation view in partly section of the still further variant of the measuring nail.
Figure 13:
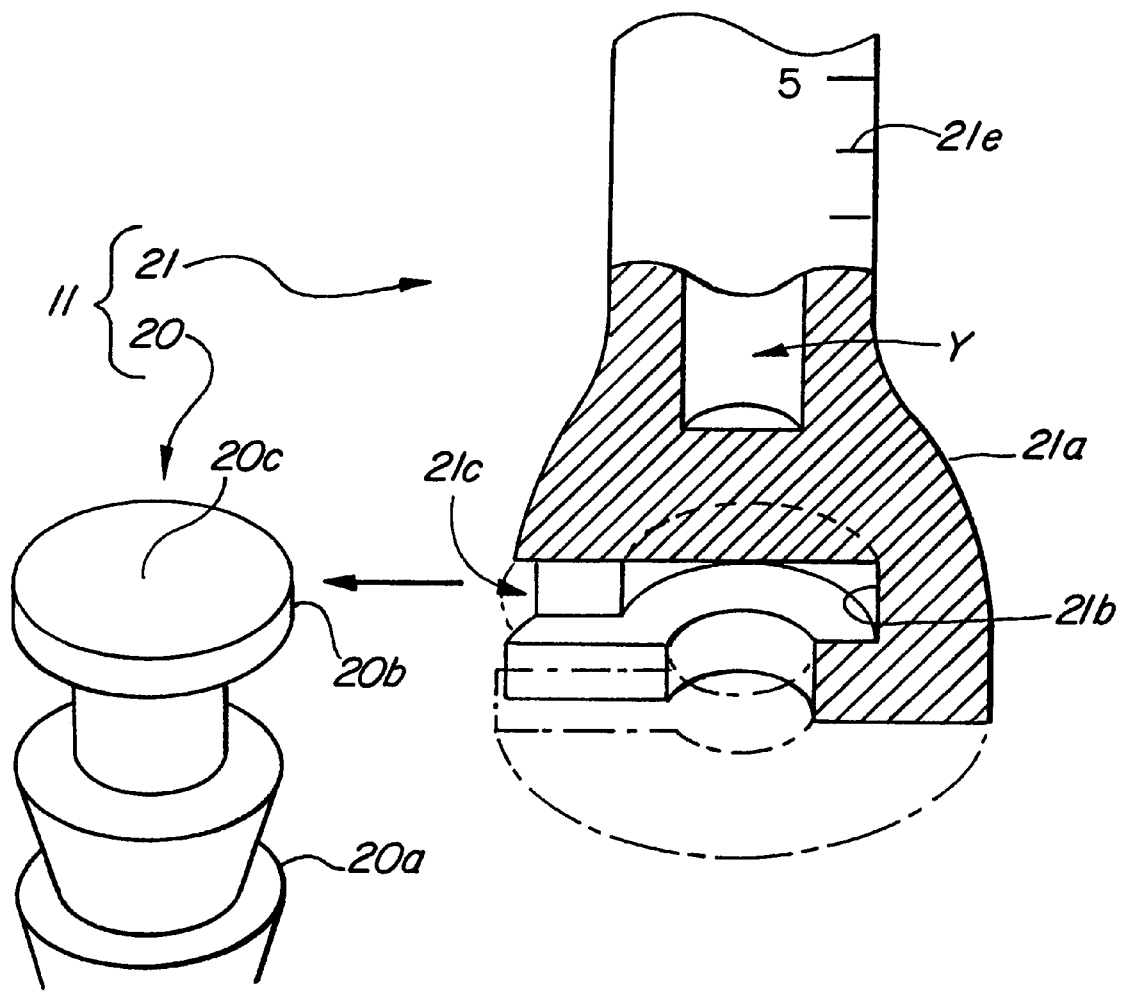
FIG. 13 is a perspective view in partly section of a main part of the measuring nail shown in FIG. 12.

In FIGS. 12 and 13, shown by 20 is a nail body in the form of a rod of rigid synthetic resin for example. The nail body 20 has a periphery on which a plurality of horizontal grooves 20a (a plurality of projections and depressions) are formed. At the top end of the nail body 20, a flange-like engaging portion 20b is formed. The horizontal grooves 20a are obliquely provided so that they can offer a reduced resistant to the pounding of the nail body 20, but can offer an increased resistant to the pulling out of it. This enables frictional resistance between the nail body 20 and the roadbed 4 to be increased, so that even when the measuring nail 11 is pushed down on the roadbed, the nail body 20 is avoided from being pulled out of the road bed 4 with ease.

On the top end of the nail body 20, a flat surface 20c to be struck with a hammer or the like is formed. This allows a sufficient force to be applied to the nail body 20 to be pounded in the roadbed 4. A cap-like cover for protecting the engaging portion 20b may be of course attached to the top end of the nail body.

On the other hand, an elastic member 21 is in the form of a closed-end cylindrical rod made of synthetic rubber and having at its bottom end a large diameter portion 21a. The large diameter portion 21a has at its center an engaging portion 21b (a recess) in the form of a hole in which the engaging portion 20b (a projection) is insertable and an insertion groove 21c communicating with the engaging portion 21b. As shown in FIG. 13, when the engaging portion 20b of the nail body 20 is pressed into the insertion groove 21c, the synthetic rubber of the larger diameter portion 21a is resiliently deformed to firmly fit into the engaging portion 20b to the engaging portion 21b.

The cylindrically formed elastic member 21 includes a cavity Y in the center part thereof. Accordingly, even when the elastic member 21 is bent at substantially right angles, the stress on the bent part can be absorbed with deformation of the cavity Y in the elastic member at the bent part. This enables the compression stress and tensile stress on the elastic member 21 to be reduced, in comparison with the columnar elastic member, to improve durability of the elastic member 21.

Shown by 21' is a cylindrical, joint use elastic member having open ends made of synthetic rubber. In the lower opening of the elastic member 21' is inserted an upper half of a connecting rod 21c made of synthetic resin and having an outer diameter equal to the inner diameter of the elastic member 21'. The lower half of the connecting rod 21' is inserted in the top end of the elastic member 21 and thereby the elastic members 21, 21' are connected to each other. The joint use elastic member 21' can be connected in series to selectively set the overall length of the measuring nail 11. The connecting rod 21c may be firmly bonded to the elastic member 21 with adhesive X. Further, the connecting rod 21c may be integrally formed with the elastic member 21' or may be bonded thereto in the manufacturing of connecting rod 21c. Each of the elastic members 21, 21' may be provided at its periphery with a scale 21e to show a vertical level from the datum surface precisely.

Figure 14:
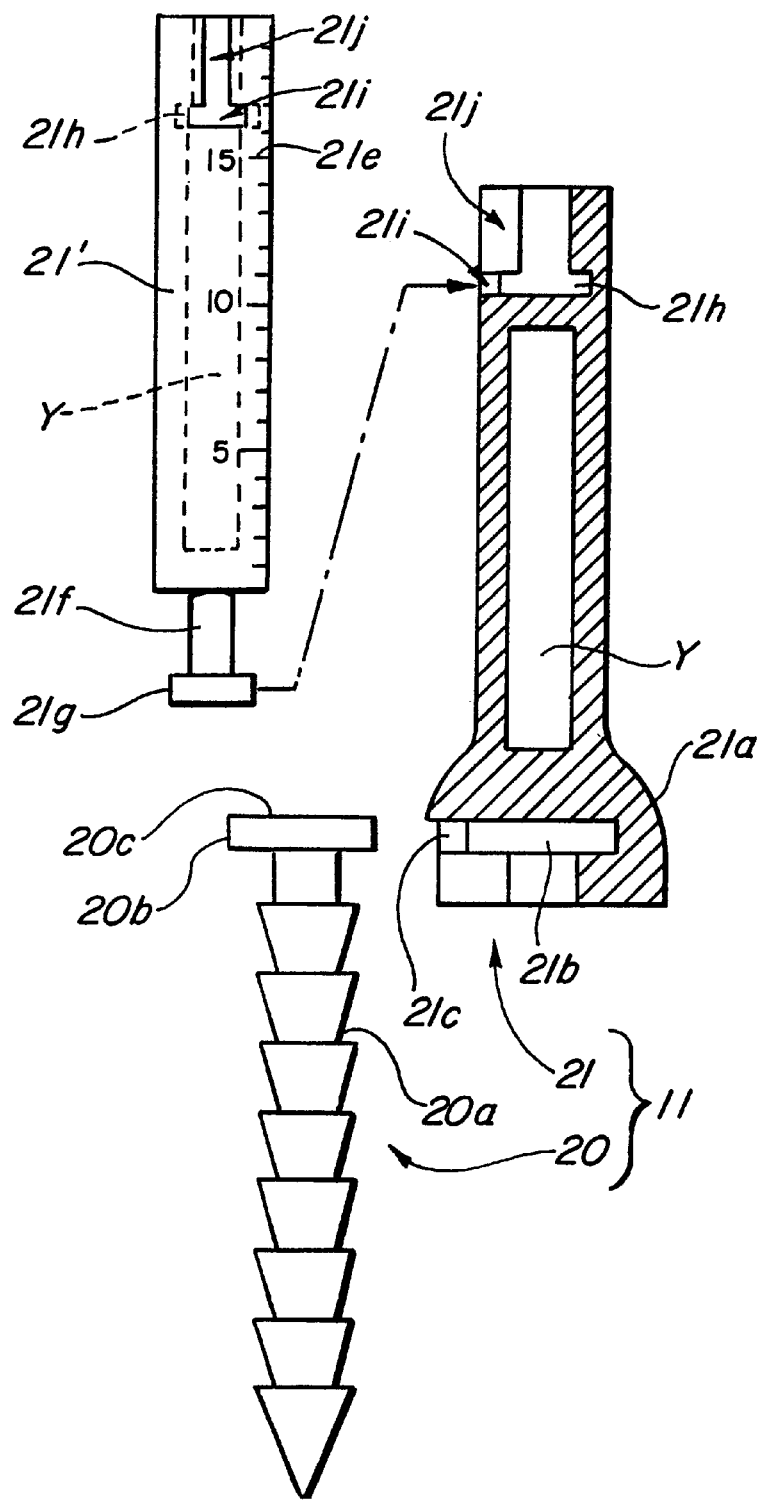
FIG. 14 is a side elevation view in partly section of a variant of the measuring nail shown in FIG. 12.

FIG. 14 illustrates another embodiment of the joint use elastic member 21'. In this figure, the joint use elastic member 21' is provided at its lower end with an engaging portion 21f having a different form from that shown in FIG. 12. In other words, the engaging portion 21f is so shaped that it can have at its lower end an integrally formed flange 21g.

On the other hand, the engaging portion 21 is provided at its top end with an engaging portion 21h engageable with the flange 21g, a groove 21i allowing the flange 21g to be inserted therein from a lateral side, and a groove 21j allowing the corresponding part of the engaging portion 21f to be inserted therein.

Further, the joint use elastic member 21' is provided at its top end with an engaging portion 21h having the same shape as the top end of the elastic member 21. By inserting the engaging portion 21f of the joint use elastic member 21' into the engaging portion 21h through the grooves 21i, 21j to engage the joint use elastic member 21' in the top end of the elastic member 21, the joint use elastic member 21' can be firmly secured to the top end of the elastic member 21 to withstand strong tensile stress.

Figure 15:
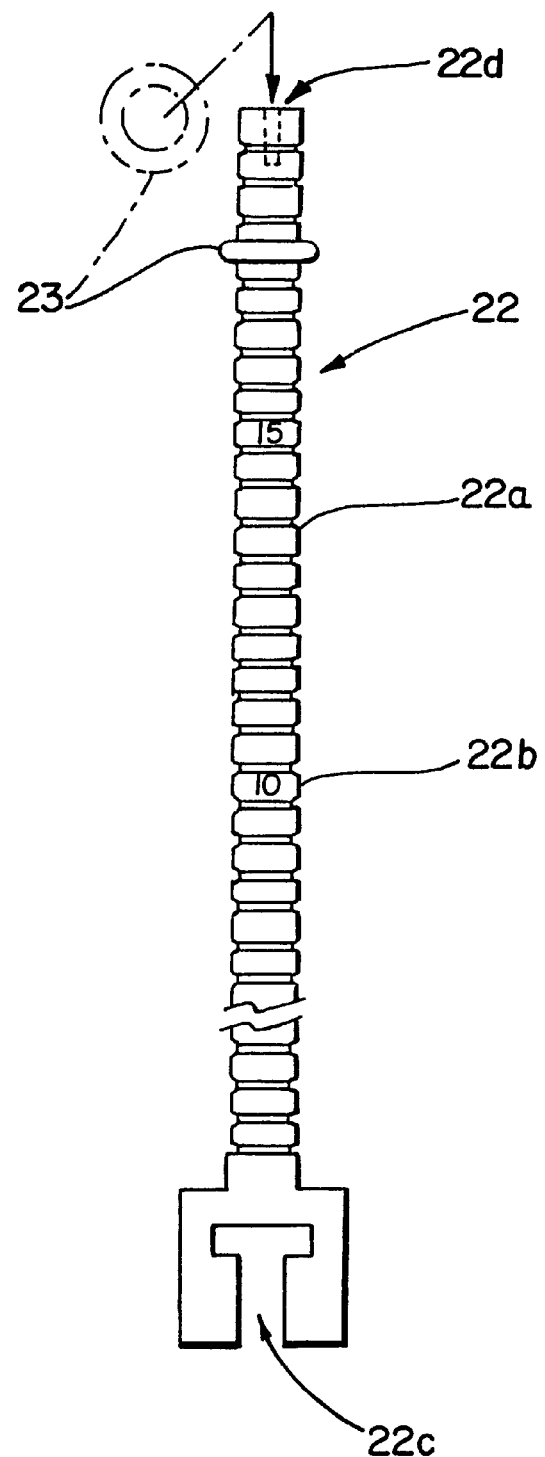
FIG. 15 is a side elevation view of a modification of the elastic member of the invention.

FIG. 15 shows a modified embodiment of the elastic member 22. The elastic member 22 shown in FIG. 15 has a periphery on which ring grooves 22a are formed along a longitudinal direction thereof at intervals of 5 mm or 1 cm. Also, a graded scale 22b to show a height from the top end of the nail body is marked on the elastic member 22 at intervals of 5 cm along the lengthwise direction. The elastic member 22 is provided at its bottom end with an engaging portion 22c having a suitable shape connectable with the engaging portion formed on the top end of the nail body to which the elastic member 22 is connected.

Similarly, the elastic member 22 is provided at its top end with an engaging portion 22d having a suitable shape for connection with any joint use elastic member (not shown). The joint use elastic member (not shown) may be provided at its periphery with similar ring grooves 22a. 23 designates a ring engageable in any of the ring groove 22a. The ring 23 is made of synthetic rubber, for example, and is colored in a striking different color from that of the elastic member 22, preferably in an opposite color to that of the elastic member 22. For instance, where the elastic member 22 is colored in red, brown or black, the ring 23 is preferably colored in green, blue, yellow or white. Further, the elastic member 22 may be formed into a cylindrical shape.

This elastic member 22 having at its periphery with the ring grooves 22a can provide the advantages that a worker can easily control the thickness of a pavement material by watching the ring grooves 22a formed at fixed intervals and can see the height of the paved road at a glance by engaging the ring 23 in any one of the ring grooves 22a, thus providing improved working efficiency. The ring grooves 22a may be used instead of the scales marked on the elastic members 3, 13, 15, 17, 19, 21, 21' in the above-described embodiments, to achieve the same effect as in this FIG. 15 embodiment.

Further, in the measuring nails 11 illustrated in the above embodiments, each scale 13e, 15b, 17c, 19d, 21e on the periphery of each elastic member may be substituted by a vinyl tape affixed to the periphery of the each elastic member or by coloration by fluorescent paint or the like applied to the periphery of the each elastic member. These modified measuring nails 11 can also be used in the same manner as in the measuring nail 1 illustrated in FIGS. 1–6. Further, the grooves 14a, 16a, the projections 18a and recesses 18b, and the grooves 20a shown in the above embodiments are just illustrated as concrete examples, and the invention is by no means limited to the illustrated configuration.

Further, the nail body 20 of the invention is not necessarily limited to the illustrated one which is formed of rigid synthetic resin to form even a complicated shape at low cost so as to contribute to reduced manufacturing costs. The nail body 20 may be of course formed of a metal to increase in strength. Further, the configuration of the engaging portion of the nail body constructed as mentioned above may be applied to that of the engaging portion of the nail body, and vice versa. In addition, the illustrated embodiments in which the joint use elastic member is connected to the nail body to selectively set the thickness of the road surface forming material cast, are just taken as examples of the invention. The scope of the invention is not limited to these illustrated embodiments.

Further, the measuring nail of the invention may be used not only when the road surface of the pavement of asphalt and the like is formed, as described in the above described embodiments, but also when a specified thickness of mortar and the like is plastered with respect to normal. Also, the elastic member of the invention may be made not only of synthetic resin including synthetic rubber, as described in the above described embodiments, but also of other suitable materials such as resilient metal, shape memory alloy, natural rubber, etc.

As described above, according to the invention, since an upper portion of the measuring nail is formed by the elastic member having resiliency, the measuring nail can be avoided from being drawn out of the roadbed at the stage at which the road surface forming material such as broken stone and the like is cast and evened and at the stage of the road surface being rolled and compacted, differently from the conventional type measuring nail, to eliminate the troublesome work of knocking the nails again. Further, the synthetic resin is preferably molded into a generally cylindrical form. This constructed measuring nail can provide the result that even when the measuring nail is trod by the motorized grader, the tired roller of the dump car, or the worker and thereby is bent at right angles, the stress on the bent part of the measuring nail can be absorbed with a cavity at the bent part deformed. This enables the compression stress and tensile stress on the elastic member to be reduced to improve durability of the elastic member.

Further, where said nail body is provided at its periphery with a plurality of projections and depressions, since a contact resistance between the nail body and the roadbed can be increased, even when a large stress at disengagement is imposed on the measuring nail, the measuring nail is prevented from being drawn out of the roadbed.

Also, since the elastic member is made of synthetic resin to be cut at a desired vertical level, changes in the thickness of the road forming material layer can be made selectively to enhance the general-purpose properties thereof. In addition, where an engaging portion of said elastic member and an engaging portion of said nail body are screwably connected to each other, the elastic member is enabled to be firmly engaged with the nail body, to prevent the elastic member from disengaged from the nail body in the middle of the pavement work.

Further, where the nail body is formed of a rigid synthetic resin, manufacturing costs of the nail body can be reduced and also a plurality of projections and depressions can be formed on the periphery of the nail body very easily.

Moreover, where said elastic member is provided at its top end with an engaging portion corresponding in shape to an engaging portion formed on a bottom end of a joint use elastic member and wherein said joint use elastic member is provided at its top end with an engaging portion similar to said engaging portion of said elastic member, since a joint use elastic member can be optionally jointed to the top end portion of the elastic member, as needed, a thickness at which the road forming material including broken stone is cast can be selectively set.

Besides, where said elastic member is provided at its periphery with scales or ring grooves at certain intervals along a longitudinal direction thereof, or where said elastic member is provided at its periphery with ring grooves at certain intervals along a longitudinal direction thereof and a ring at least having a different color from said elastic member is engaged in any one of said ring grooves, the thickness of the road forming material can be controlled by use of the scales, the ring grooves or the ring, to facilitate the work.

What is claimed is:

1. A measuring nail comprising, a rigid solid nail body with a solid surface top end that can be struck with force so it is embedded in a roadbed and a relatively flexible rod-like elastic member removably engageable with the top end of said nail body, whereby the elastic member can bend without moving the position of the nail body, the elastic member is formed of a synthetic resin and is cuttable at a desired vertical level, the elastic member has an engaging cavity portion at one end, the cavity portion has a configuration complimentarily to the top end of the nail body in the form of a horizontal flange and a vertical slot so that the engaging cavity portion is operatively positioned on the top end of the nail body by a horizontal sliding operation with the horizontal flange receiving the top end of the nail body and the vertical slot receiving a portion of the nail body.

2. A measuring nail according to claim 1, wherein said synthetic resin is molded into a generally cylindrical form so that said elastic member can have a cavity at its center in a horizontally sectioned form.

3. A measuring nail according to claim 1, wherein said nail body is provided at its periphery with a plurality of projections and depressions.

4. A measuring nail according to claim 1, wherein said nail body is formed of rigid synthetic resin.

5. A measuring nail according to claim 1, wherein said elastic member is provided at its periphery with scales or ring grooves at certain intervals along a longitudinal direction thereof.

6. A measuring nail according to claim 1, wherein said elastic member is provided at its periphery with ring grooves at certain intervals along a longitudinal direction thereof and a ring at least having a different color from said elastic member is engaged in any one of said ring grooves.

* * * * *